United States Patent [19]
Hagqvist

[11] Patent Number: 5,500,247
[45] Date of Patent: Mar. 19, 1996

[54] METHOD FOR PRODUCTION OF A CONTINUOUS WEB OF FLUID PURIFIER MEMBRANE FILTER STOCK MATERIAL HAVING A LOW PRESSURE SIDE PERMEABLE LAYER SANDWICHED BETWEEN TWO MEMBRANE CARRIER LAYERS HAVING CAST-IN PLACE EXTERNAL MEMBRANES

[75] Inventor: Peter Hagqvist, Älvsjö, Sweden

[73] Assignee: AB Electrolux, Stockholm, Sweden

[21] Appl. No.: 158,384

[22] Filed: Nov. 29, 1993

[30] Foreign Application Priority Data

Nov. 27, 1992 [SE] Sweden .................................. 9203577

[51] Int. Cl.$^6$ .............................. B05D 1/36; B05D 1/40; B05D 3/02; B05D 3/12
[52] U.S. Cl. .......................... 427/244; 427/209; 427/261; 427/284; 427/289; 427/316
[58] Field of Search .................................... 427/244, 246, 427/209, 289, 284, 361, 316

[56] References Cited

U.S. PATENT DOCUMENTS

| | | | |
|---|---|---|---|
| 3,121,018 | 2/1964 | Wood, Jr. et al. | 427/289 |
| 3,245,822 | 4/1966 | Gewiss | 427/289 |
| 4,114,284 | 9/1978 | Weber et al. | 427/242 |
| 4,167,594 | 9/1979 | Schwadtke et al. | 427/242 |
| 4,177,151 | 12/1979 | Siu et al. | 427/242 |
| 4,229,475 | 10/1980 | Barrett et al. | 427/242 |
| 4,346,126 | 8/1982 | Kutowy et al. | 427/246 |
| 4,659,496 | 4/1987 | Klemm et al. | 427/242 |
| 4,685,900 | 8/1987 | Honard et al. | 427/2.3 |
| 4,733,774 | 3/1988 | Ping, III et al. | 427/242 |
| 4,770,777 | 9/1988 | Steadly et al. | 427/246 |
| 4,814,204 | 3/1989 | Carey et al. | 427/359 |
| 5,110,843 | 5/1992 | Bries et al. | 427/209 |

Primary Examiner—Diana Dudash
Attorney, Agent, or Firm—Cushman Darby & Cushman

[57] ABSTRACT

In a method for producing a membrane filter for a fluid purifier, wherein the filter includes a pair of membrane layers and a spacer layer placed therebetween, a layer of membrane-forming casting solution is applied to the outer surfaces of a web of fluid-permeable starting material for the membrane layers and the spacer layer. The web-like starting material is passed through a bath so as to gel the casting solution.

8 Claims, 4 Drawing Sheets 5,500,247

METHOD FOR PRODUCTION OF A CONTINUOUS WEB OF FLUID PURIFIER MEMBRANE FILTER STOCK MATERIAL HAVING A LOW PRESSURE SIDE PERMEABLE LAYER SANDWICHED BETWEEN TWO MEMBRANE CARRIER LAYERS HAVING CAST-IN PLACE EXTERNAL MEMBRANES

BACKGROUND OF THE INVENTION

The present invention relates to a method for producing a membrane filter for a fluid purifier, the filter comprising a pair of membrane layers and a spacer layer arranged therebetween.

In known methods of producing such membrane filters, which normally comprise two membrane layers or sheets which define therebetween a cavity in which a spacing element is placed, the filters are generally assembled individually, often by manually handling prepared sheet-like components.

SUMMARY OF THE INVENTION

An object of the present invention is to provide a method and a membrane filter of the kind defined in the introduction which enable mechanized production of the filter from a preformed composite or integrally formed membrane filter web, by continuously working and treating one or more web-like membrane-filter carrier or starting material.

According to one aspect of the invention, a membrane filter web is produced by applying a layer of membrane-forming casting solution to the two outer surfaces of a web-like fluid-permeable membrane-layer starting material and to the spacing layer, and by passing the starting material through a casting-solution gelation bath. Application of the membrane layers to the two opposing sides of an assembled web of prepared membrane-filter starting material in this way eliminates the earlier costly handling of the separate sheet-like components in producing the envelope-like membrane filter bodies.

The web-like starting material can be formed by combining mutually two webs of membrane-layer carrier sheets and an intermediate web of the spacing layer or sheet. Alternatively, and beneficially, the starting material web may be produced by mutually combining two webs which each present an outer carrier layer that has been integrated with an inner spacing layer. The starting material may also include only one web which comprises two outer carrier layers that are integrated with an inner spacing layer. In the latter cases, the starting material web will suitably include a thermoplastic fibre fabric for the spacing layer, wherein the outer carrier layers are formed by heat-treating the surface of the fibre fabric in a manner to obtain a densified carrier structure adapted for the application of the membrane layer.

In order to enclose the inner spacing layer within the carrier layer, the mutually opposing longitudinally extending edge parts of the starting material web are mutually joined or sealed in the longitudinal direction of the filter web so as to obtain a fluid-tight joint, for instance by welding.

These edge parts may be provided with indentations or perforations, such as punched holes, for engagement with means for controlled advancement of the filter web in a precise manner through the various treatment stations. This will also enable the web to be stretched in a desired manner in both its length and its width directions during treatment of the web in the various stations.

According to the invention, the layers of casting solution may be provided with a pattern of mutually parallel and mutually spaced beads or strings which serve as spacing elements. This will enable finished membrane modules to be produced from the membrane web, mainly by simply folding together stacks of continuous web elements, without needing separate sheet-like spacer elements.

The beads or strings are suitably formed by shaping grooves in the casting solution, and, in accordance with one preferred embodiment of the invention, by means of a coating device which moves reciprocatingly transversely to the web movement direction and which presents a profiled region that abuts an associated outer surface of the web, so as to produce the pattern with alternating orientation in the casting solution applied to the surface.

Alternatively, the beads or strings may be formed by applying separate bead material to the casting solution.

Other features of the invention and advantages afforded thereby will be evident from the following description.

BRIEF DESCRIPTION OF THE DRAWINGS

The invention will now be described in more detail with reference to exemplifying embodiments thereof and also with reference to the accompanying drawings, in which.

DETAILED DESCRIPTION

Figure 1:
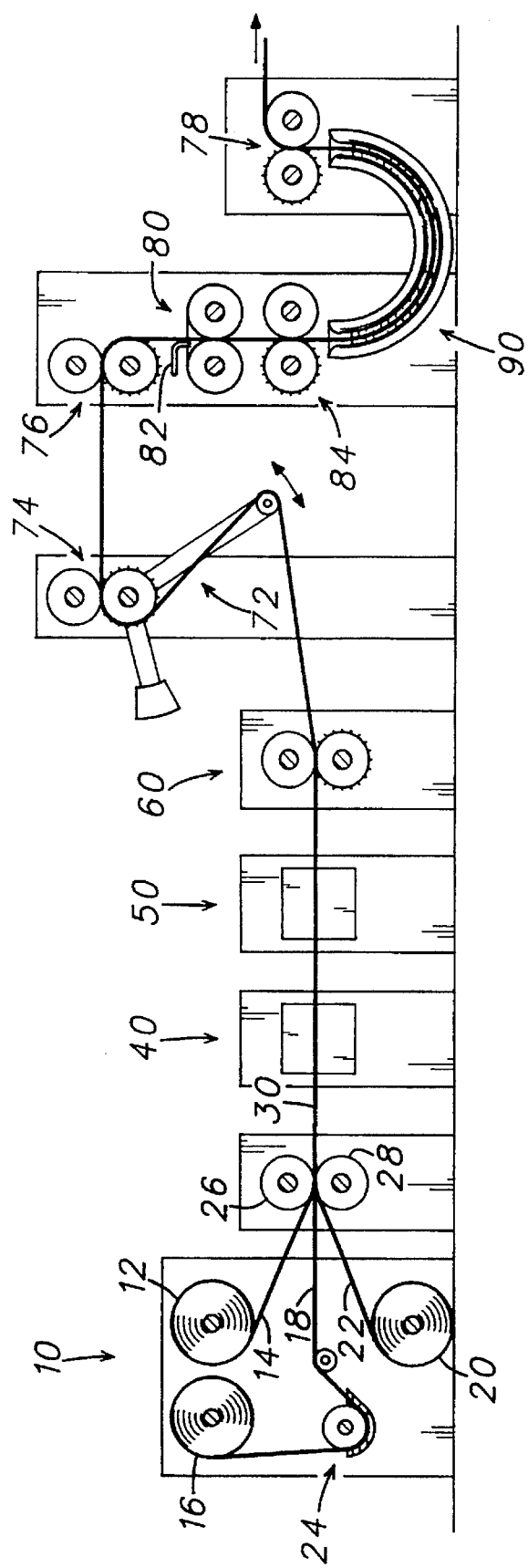
FIG. 1 illustrates schematically a production plant for producing a membrane filter web in accordance with the invention.

The plant illustrated in FIG. 1 includes generally the following major components: a store 10 of filter-web starting material, a welding station 40, a hole-forming station 50, a web advancing station 60, a web-coating station 80 and a gelation station 90.

In the illustrated case, the store 10 includes three storage rolls 12, 16, 20 which carry webs of fluid-permeable, membrane-filter starting materials 14, 18 and 22 respectively, of which the materials 14, 22 consist of fabric carrier layers which are to be coated with membrane layers in the station 80, while the material web 18 is a spacing material of the net or grid type. For instance, the fabric may be a polyester nonwoven fabric and the spacing material may be a rigid epoxy-coated polyester fabric. The spacing material, however, may alternatively be a fluid-permeable nonwoven material.

As shown in FIG. 1, there is arranged in connection with the storage roll 16 a wetting station 24 which contains, for instance, polyvinyl alcohol so as to impart suitable properties to the spacing material 18 prior to the following working and processing operations.

Prior to entering the welding station 40, the three material webs 14, 18, 22 are brought together by means of a pair of rollers 26, 28 and, although not shown, possibly also with the aid of lateral guides, to form a composite web 30.

Figure 2:
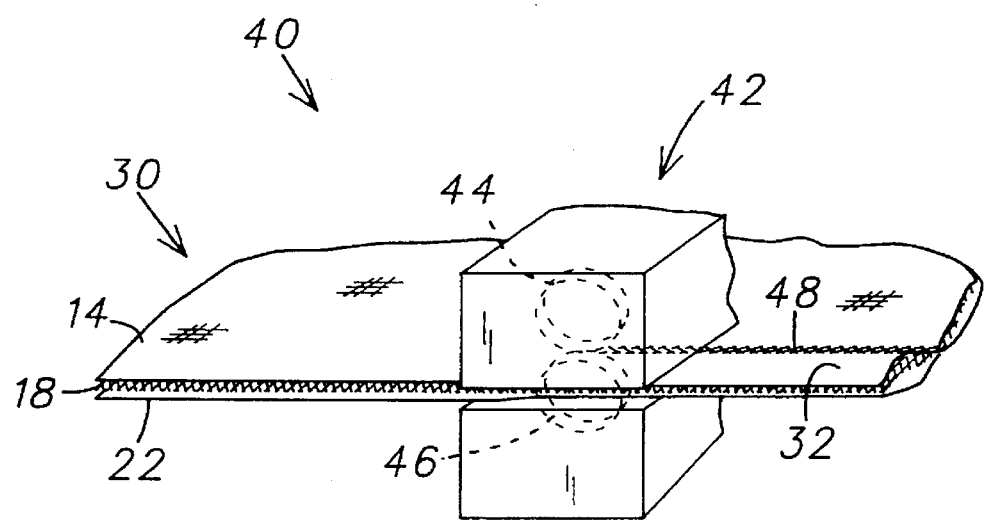
FIG. 2 is a schematic, perspective view of a welding station.

In the welding station 40 illustrated schematically in FIG. 2, fusion welding devices 42 (only one of which is shown) are arranged in each region of the side edge-parts of the composite web 30, these devices 42 functioning to linearly compress and fuse together the three layers 14, 18, 22 of the web 30, for instance with the aid of mutually opposing disc-type or roller-type welding means 44, 46, as the web 30 is advanced intermittently through the welding and hole-forming stations 40 and 50, as described later on. In this way, there is obtained a longitudinally extending weld 48 which is spaced from respective long edges of the web 30 and which mutually joins the layers 14, 18, 22 in a fluid-tight fashion or seals those edge parts.

Figure 3:
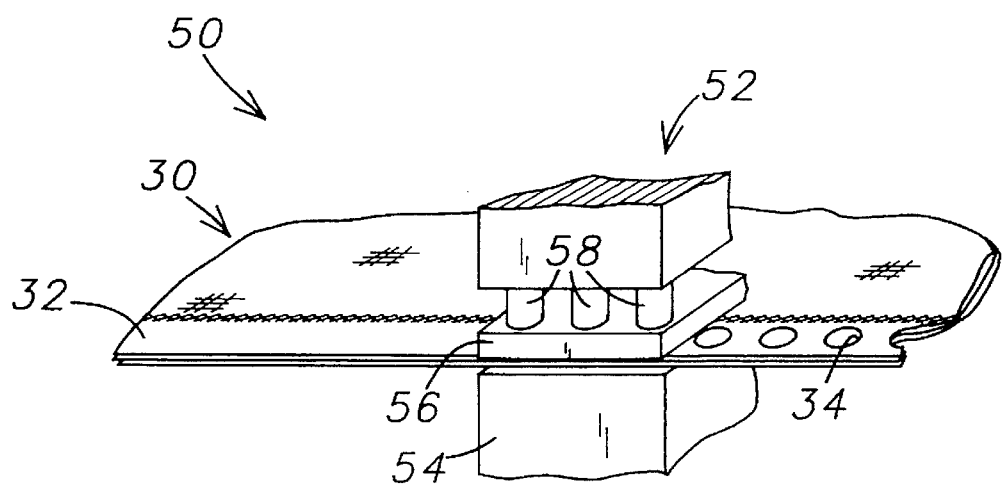
FIG. 3 is a view corresponding to the view of FIG. 2 and illustrates a hole forming station.

In the downstream hole forming station 50 illustrated in FIG. 3, a hole-punching unit 52 (only one of which is shown) is mounted in each region of the side-edge parts of the composite web 30. In the case of the illustrated embodiment, each punch unit 52 includes a press (not shown in detail) which includes a die cushion 54 and a perforated web holder 56 which is intended to hold the edge region 32 of the web 30 lying outside the weld seam firmly against the cushion 54 during a hole-forming-operation. The actual punch tool 58 will suitably include a plurality of hole punches disposed at given distances apart in the longitudinal direction of the web 30 so as to form web-advancing holes 34 in the edge region 32 between each intermittent advancement of the web 30.

Figure 4:
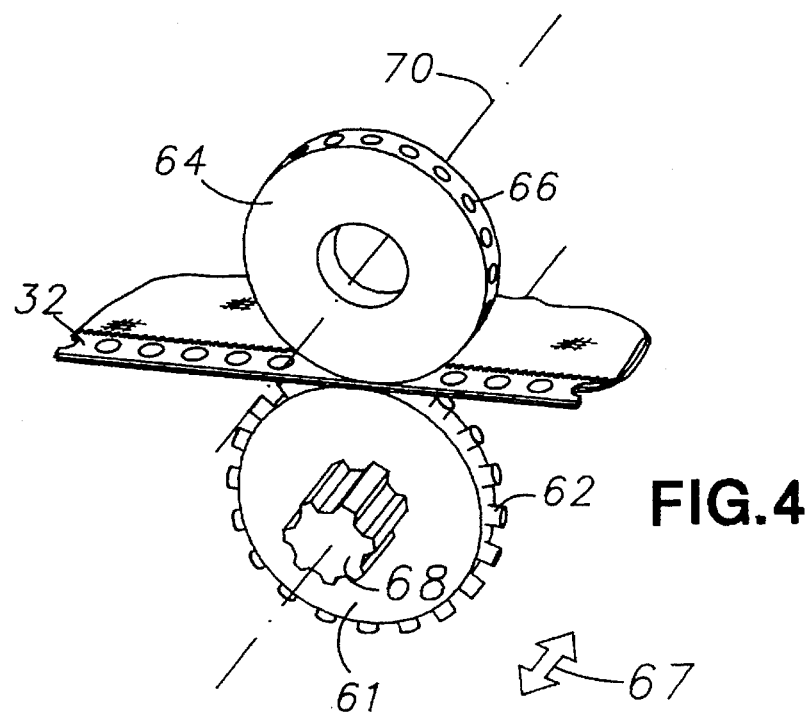
FIG. 4 is a view corresponding to the view of FIG. 2 and illustrates a pair of web advancing wheels.

In the web-advancing station 60 shown in FIG. 4, there is arranged at each edge region 32 of the now longitudinally welded and perforated web 30 a pair of mutually engaging web-advancing wheels 61, 64 which engage in the holes in the edge regions 32 and of which only one is shown. In the illustrated embodiment, each pair of wheels 61, 64 is provided with complementary, peripherally disposed and uniformly spaced engagement devices in the form of web-advancing knobs or teeth 62 and recesses 66 for specific forward indexing of the web 30. As indicated by the double arrow 67, the web-advancing wheels are also axially displaceable to provide correct cross-stretching of the web 30 for the welding and punching operations. This can be achieved, for instance, by mounting the driven advancing wheel 61 on a splined shaft 68, as illustrated in FIG. 4. Alternatively, each pair of wheels 61, 64 may be mounted on a bearing stand (not shown) which can be moved transversely to the longitudinal axis of the web. The force required to stretch the web transversely can be generated, for instance, with the aid of passive springs or with the aid of manually operated or motor-driven setting devices (not shown).

The shafts on which the web-advancing wheels are mounted are driven conveniently by a motor with controllable or registerable rotational movement, for instance a pulse-guided stepping motor having a stepping angle which is an even multiple of the pitch angle of the web-advancing teeth 62, so that intermittent advancement of the web 30 will always take place with an even number of hole distances which coincide with the number Of hole punches in the hole-forming station.

The longitudinally welded and perforated web 30 is suitably advanced continuously downstream of the web-advancing station 60. The web 30 is provided with slack in order to take-up the differences between the continuous and intermittent advancement of the web. As shown in FIG. 1, this slack can be taken-up by a resilient tensioning device 72, for instance in the form of a weight-biased angled lever in accordance with the illustrated embodiment.

Although the web 30 has been described as being advanced intermittently in the foregoing, it will be understood that the web may alternatively be advanced continuously through all stations. For instance, the web tensioning device 72 may be dispensed with when the holes are formed in the web by means of a punch device which has, e.g., a rotating punch tool in the form of a punch wheel provided with retractable and extendable punching elements which punch holes in the continuously advanced web (not shown) as the punch wheel rotates.

Mounted adjacent the tensioning device 72 are two further pairs of mutually engaging wheels 74 (only one of which is shown) corresponding to the web-advancing wheels 61, 64 in FIG. 4. The wheel pair 74 may be non-driven if considered sufficient.

Downstream of the wheel pair 74, there is mounted still another pair of wheels 76, at which the web 30 is deflected to follow a vertical movement path through the following coating station 80.

Figure 5:
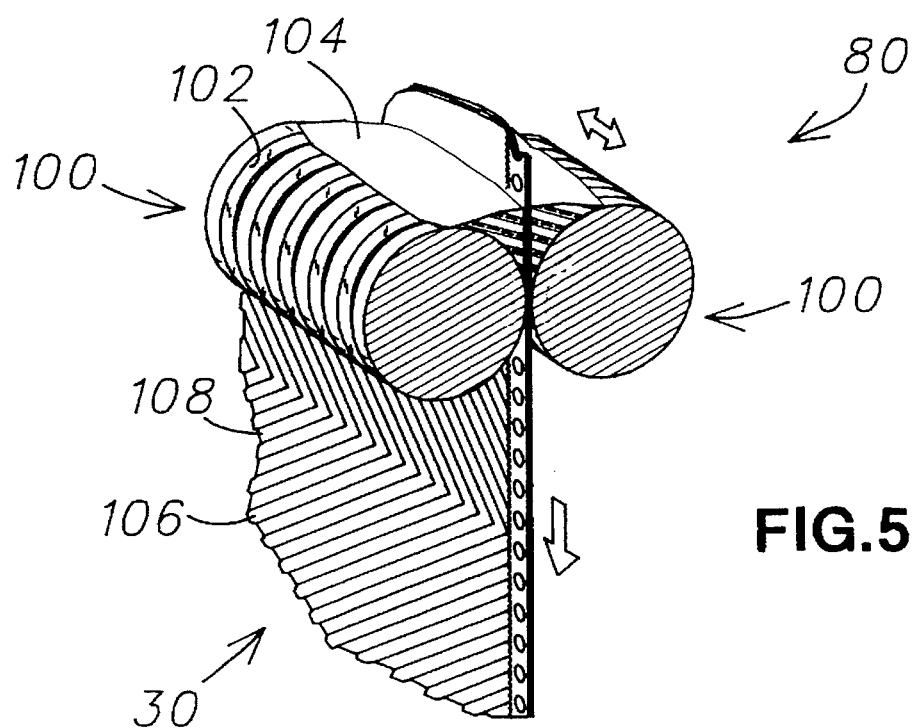
FIG. 5 is a schematic, perspective view of a web coating station.

As will be evident from the embodiment shown only partially in FIG. 5, the coating station 80 includes a pair of mutually opposing coating devices or applicator rolls 100, each of which abuts a respective side of the web 30. Machined in the peripheral surfaces of the coating devices 100 is a plurality of closely packed grooves 102 which provide a profiled abutment region. The coating devices are mounted for reciprocal movement transversely to the web 30 at a frequency and speed which are adapted to the speed of the web. A casting solution 104 (containing for instance a polymer dissolved in dimethylformamine) is delivered to the nip defined by the upper surfaces of the coating devices or rolls 100, 100 during movement of the web 30 and these rolls. During operation, the casting solution is delivered continuously to the nip through a delivery pipe 82 (FIG. 1). Although not shown, the coating station 80 may be equipped with known devices, such as trays, doctor blades and sealing devices with the intention of enclosing the casting solution in the nip region. As the rolls 100 and the web 30 move in relation to one another in operation, the casting solution will be applied to both sides of the web 30 in a pattern which corresponds to the pattern of grooves formed in the coating devices 100 and present a profile and which exhibits wave crests, ridges or raised beads or strings 106 and wave troughs or grooves 108.

Although not shown in the FIG. 1 schematic illustration, the coating station 80 may be divided into two sub-stations, of which a first sub-station functions to coat the web with a membrane-forming layer of casting solution of even thickness, while a second sub-station handles the production or extrusion of the groove or string pattern in the membrane-forming layer.

Arranged downstream of the coating station 80 is a further web-advancing station 84 which functions to advance the web 30 now coated with casting solution. The web-advancing wheels of this further station 84 are suitably driven at a constant speed which is adapted to the intermittent advancing speed of the web-advancing station 60.

There then follows an aqueous gelation bath 90—in which the casting solution 104 applied in the grooved patterns on respective outer surfaces of the whole of the web surface-gels. The applied casting solution is caused to solidify in the gelation bath in a manner known within the filter technique and thereby to form a membrane layer which possesses desired filter properties (for instance nano-, ultra- or osmosis-filter properties), depending on the concentration of solvent in the casting solution and in the gelation bath.

Arranged downstream of the gelation bath is a further web-advancing station 78 which advances the prepared filter web for further treatment, such as drying, cutting and the production of finished filter modules for fluid purifiers.

The patterns of alternating ridges 106 and grooves 108 produced on the outer surfaces of the web 30 are used in the finished filter modules as mutually crossing spacer elements between mutually stacked and mutually abutting filter web sections in order to permit the inflow of fluid to be cleansed between the filter sections. The aforedescribed spacer-forming elements 18 function as corresponding spacer elements for the cleansed fluid that has passed through the membrane layer.

In the case of the illustrated embodiment, the coating rolls are provided with grooves which form the spacer ridges or strings 106. Alternatively, the strings may be formed by applying separate spacer threads in a corresponding pattern on the casting solution. The threads may be of any suitable material and may be applied with the aid of a shuttle-like device on the coated web prior to immersing the web into the gelation bath (not shown).

According to the aforegoing, the filter web 30 is produced from three separate webs 14, 18, 22. However, as illustrated in FIGS. 6 and 7, the filter web starting material may alternatively, and advantageously, consist of two webs or of solely one web provided with mutually integrated carrier and spacing layers.

Figure 6:
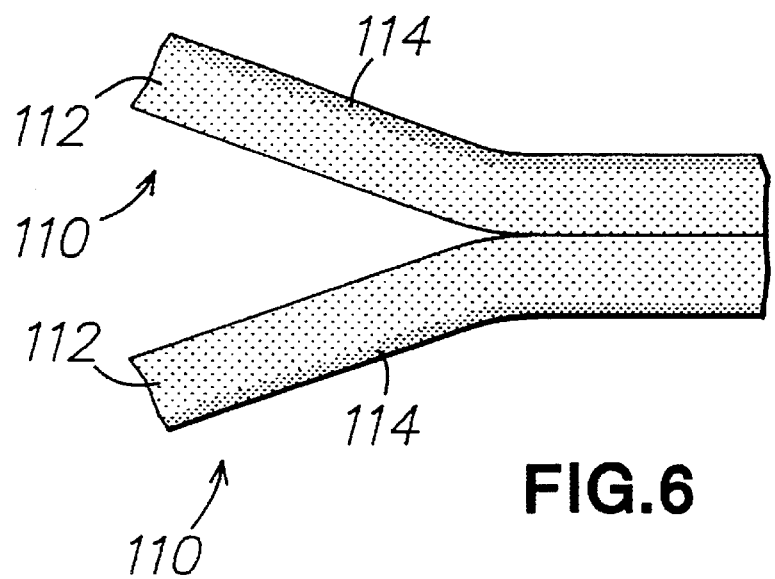
FIG. 6 is a longitudinal sectioned view of a first alternative starting material web for a membrane filter.

In the FIG. 6 embodiment, the two webs 110, 110 each consist of a thermoplastic, fluid-permeable nonwoven material, for instance polyester material, whose one surface has been heated so as to densify the structure of the surface layer 114 and therewith obtain appropriate carrier properties with regard to mechanical strength and also with regard to the application of the membrane-forming casting solution. The two remaining, untreated nonwoven layers 112 together form the spacing intermediate layer of the web (the permeation spacer) which permits fluid flow within the finished membrane filter.

Figure 7:
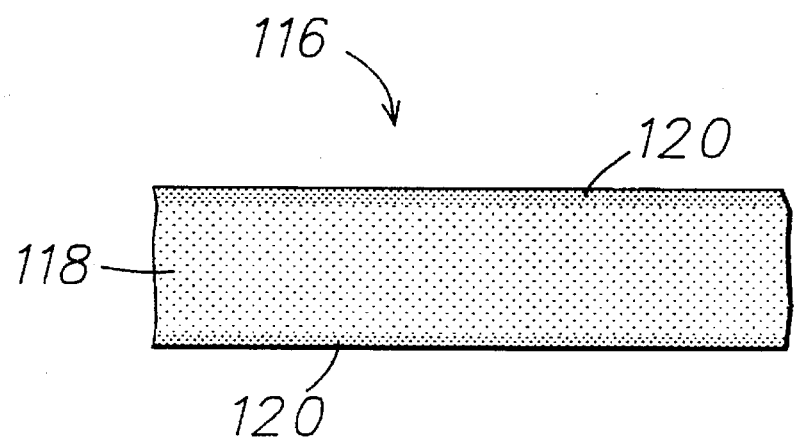
FIG. 7 is a longitudinal sectioned view of a second alternative membrane-filter starting material.

The nonwoven web 116 in FIG. 7 is correspondingly heat-treated on both sides to obtain a filter web which is formed in one piece or integrated with two opposing carrier layers 120, 120 and an intermediate spacer layer 118. The heat-treatment process may also be extended to the edge parts of the web, to densify the edge parts or seal the edge parts in a fluid-tight fashion (not shown).

The membrane filter web described with reference to the different exemplifying embodiments thereof can be adapted for its intended use in different ways known within fluid purifier technology, for instance for use in RO-type filters, ultrafilters and nanofilters. For instance, as before mentioned, the web can be folded together to form a stacked membrane module, or may be cut to form separate filter elements which are intended to be placed in stacked relationship. The interior of each filter element or filter envelope in the stack is connected to an outgoing permeate line for the fluid to be cleansed as it passes through the membrane layers of the filter. This connection can be achieved advantageously by forming penetrating openings in the regions of each filter element of the web. The openings are positioned so that when the stack is formed, they will form at least one throughpassing channel in the stack. When the region around each opening on the outer sides of the filter elements is connected in a fluid-tight fashion with corresponding regions of the outside of the immediately neighbouring filter elements, the channel will communicate solely with the interiors of the filter elements. This enables the permeate or the cleansed fluid to be readily carried away from a channel which is common to all permeate spaces in the filter elements (not shown).

I claim:

1. A method for producing a flat membrane filter web for a fluid purifier, comprising:

(a) providing a continuous, flat web having first and second, opposite-side membrane carrier layers which sandwich between them an intermediate spacer layer, said layers having respective first and second longitudinal edge margins, and said membrane carrier layers having opposite outer surfaces;

(b) continuously conducting said web through an edge-sealing station, and therein, on longitudinally successive increments of said web, sealing said first edge margins and sealing said second edge margins, so as to seal-off said intermediate spacer layer from externally of the web at said edge margins and thereby define of said intermediate spacer layer between said edge margins a permeate space for acting as a low pressure side of a filter for a fluid purifier;

(c) continuously conducting said web through a coating station located downstream of said edge-sealing station, and therein, on longitudinally successive increments of said web, applying a membrane-forming casting solution to said opposite outer surfaces of said membrane carrier layers; and (d) continuously conducting said web through a casting solution gelation station located downstream of said coating station, and therein, on longitudinally successive increments of said web, activating gelling of said casting solution.

2. The method of claim 1, wherein:

in step (a), providing said continuous flat web comprises progressively juxtaposing in facewise engagement two continuous webs of membrane carrier layer material onto opposite sides of a continuous web of spacer layer material.

3. The method of claim 1, wherein:

in step (a), providing said continuous flat web comprises progressively juxtaposing in facewise engagement two continuous webs each of which includes all of a respective one of said membrane carrier layers and a respective thicknesswise complementary portion of said intermediate spacer layer.

4. The method of claim 1, wherein:

in step (a), providing said continuous flat web comprises progressively heat-treating longitudinally successive increments of a web integrally made of non-woven thermoplastic material on both of two opposite sides thereof, and thereby converting respective portions thereof into said membrane carrier layers.

5. The method of claim 1, wherein:

in step (c), some of said casting solution is applied with non-uniformity of thickness, so that as a result of conducting step (d), the web is provided on said outer surfaces with a pattern of strings or beads of gelled casting solution, the pattern being spatially arranged such that upon stacking juxtaposition of successive increments of said web, respective beads or strings on resultingly confronting ones of such increments engage to act as spaces.

6. The method of claim 5, wherein:

in step (c), said casting solution is applied by coating devices while said coating devices are being reciprocatingly moved widthwise of the web, for thereby providing said pattern.

7. The method of claim 1, further comprising:

as part of step (c), applying on said outer surfaces of said web a raised pattern of strings or beads which are at least partially embedded in said casting solution and spatially arranged such that upon stacking juxtaposition of successive increments of said web, respective beads or strings on resultingly confronting ones of such increments engage to act as spaces.

8. The method of claim 1, wherein:

in step (b), said sealing is effected by welding.

\* \* \* \* \*